(12) United States Patent
Naruke et al.

(10) Patent No.: US 9,901,991 B2
(45) Date of Patent: Feb. 27, 2018

(54) DRILL

(71) Applicant: MITSUBISHI MATERIALS CORPORATION, Tokyo (JP)

(72) Inventors: Koichiro Naruke, Anpachi-gun (JP); Sohei Takahashi, Anpachi-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 3 days.

(21) Appl. No.: 14/913,000

(22) PCT Filed: Aug. 20, 2014

(86) PCT No.: PCT/JP2014/071738
§ 371 (c)(1),
(2) Date: Feb. 19, 2016

(87) PCT Pub. No.: WO2015/025872
PCT Pub. Date: Feb. 26, 2015

(65) Prior Publication Data
US 2016/0207119 A1    Jul. 21, 2016

(30) Foreign Application Priority Data

Aug. 22, 2013   (JP) ................................. 2013-172333

(51) Int. Cl.
*B23B 51/02* (2006.01)

(52) U.S. Cl.
CPC .......... *B23B 51/02* (2013.01); *B23B 2250/12* (2013.01); *B23B 2251/406* (2013.01); *B23B 2251/408* (2013.01); *Y10T 408/9097* (2015.01)

(58) Field of Classification Search
CPC ............... B23B 51/02; B23B 2251/408; Y10T 408/9097
See application file for complete search history.

(56) References Cited

U.S. PATENT DOCUMENTS

| | | | | |
|---|---|---|---|---|
| 4,583,888 A | * | 4/1986 | Mori ....................... | B23B 51/02 408/144 |
| 5,088,863 A | * | 2/1992 | Imanaga ................. | B23B 51/02 408/144 |

(Continued)

FOREIGN PATENT DOCUMENTS

| | | |
|---|---|---|
| DE | 102008023856 A1 | 11/2009 |
| JP | 07-237017 A | 9/1995 |

(Continued)

OTHER PUBLICATIONS

International Search Report dated Nov. 18, 2014, issued for PCT/JP2014/071738.

(Continued)

*Primary Examiner* — Eric A Gates
(74) *Attorney, Agent, or Firm* — Locke Lord LLP

(57) ABSTRACT

Provided is a drill suitable for high-efficiency working. A cut debris discharge groove is formed in the outer periphery of the drill body front end section rotated about the axis, and a cutting edge is formed at the front end of the drill body. The wall surface of the cut debris discharge groove, which faces the rotational direction of the drill, is formed to have a concave curve line shape in a cross-section perpendicular to the axis, the concave curve line shape extending along a first circular arc.

2 Claims, 2 Drawing Sheets

(56) References Cited

U.S. PATENT DOCUMENTS

| | | | | |
|---|---|---|---|---|
| 5,230,593 | A * | 7/1993 | Imanaga | B23B 51/02 408/144 |
| 5,486,075 | A * | 1/1996 | Nakamura | B23B 51/02 408/224 |
| 5,678,960 | A | 10/1997 | Just et al. | |
| 5,716,172 | A * | 2/1998 | Nakamura | B23B 51/02 408/227 |
| 6,916,139 | B2 | 7/2005 | Yanagida et al. | |
| 8,317,438 | B2 * | 11/2012 | Mergenthaler | B23B 47/34 408/230 |
| 8,545,141 | B2 | 10/2013 | Jindai et al. | |
| 9,522,428 | B2 * | 12/2016 | Jindai | B23B 51/02 |
| 2003/0175086 | A1 * | 9/2003 | Muhlfriedel | B23B 51/02 408/230 |
| 2004/0101379 | A1 * | 5/2004 | Mabuchi | B23B 51/02 408/230 |
| 2010/0092259 | A1 * | 4/2010 | Borschert | B23B 51/02 408/230 |
| 2010/0215452 | A1 * | 8/2010 | Jindai | B23B 51/02 408/230 |
| 2011/0081215 | A1 * | 4/2011 | Nakamura | B23B 51/02 408/230 |
| 2011/0170973 | A1 | 7/2011 | Von Puttkamer et al. | |
| 2012/0201619 | A1 | 8/2012 | Olsson | |
| 2015/0283624 | A1 | 10/2015 | Jindai | |

FOREIGN PATENT DOCUMENTS

| | | |
|---|---|---|
| JP | 09-501109 A | 2/1997 |
| JP | 2007-229900 A | 9/2007 |
| JP | 4120185 B2 | 7/2008 |
| JP | 4894054 B2 | 3/2012 |
| JP | 2012-161912 A | 8/2012 |
| JP | 2014-083645 A | 5/2014 |

OTHER PUBLICATIONS

Supplementary European Search Report dated Feb. 27, 2017, issued for the European patent application No. 14838711.1.

* cited by examiner

[Fig. 1]
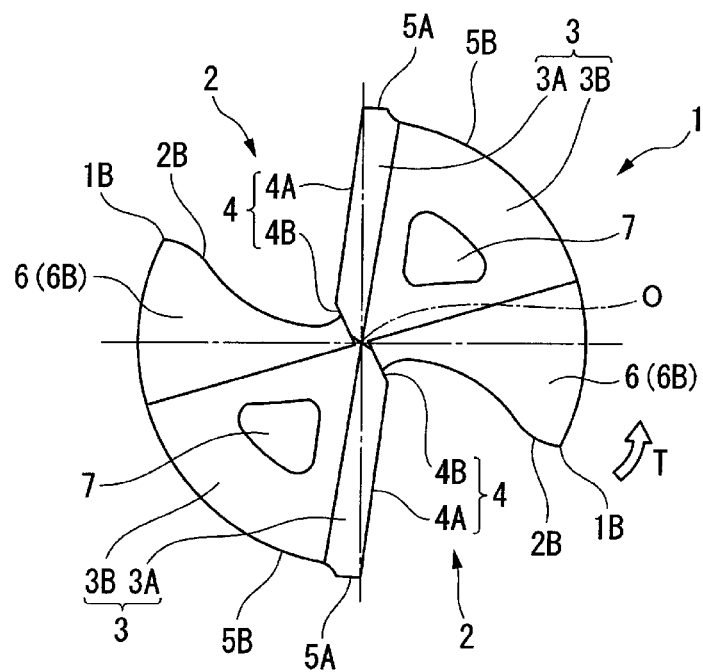
[Fig. 2]
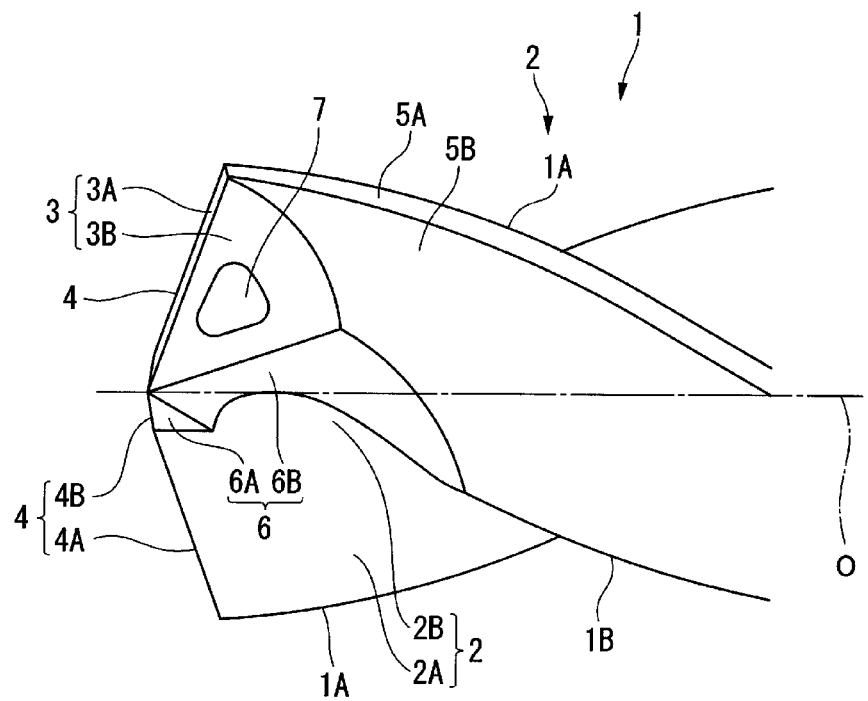

[Fig. 3]
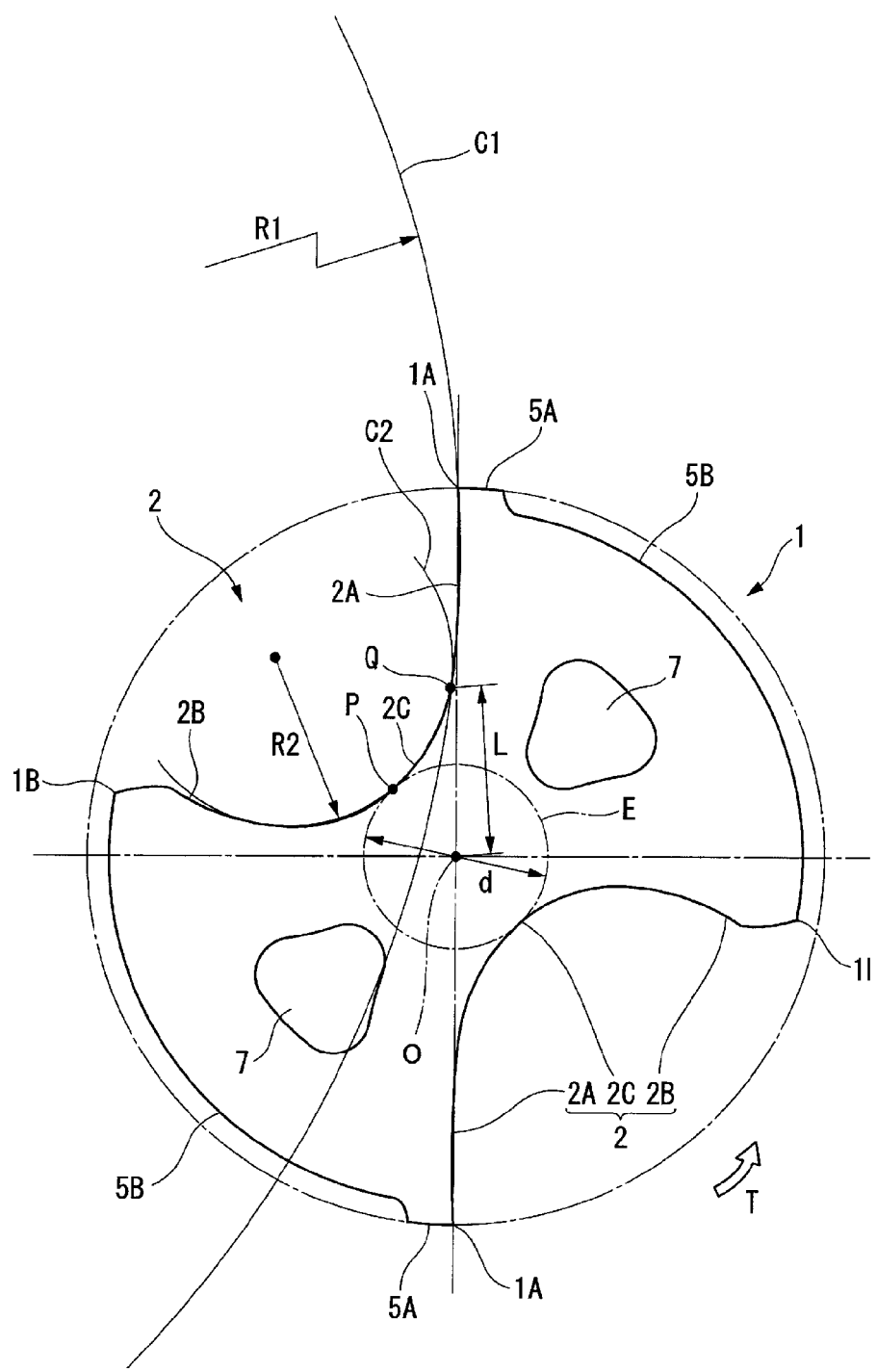

DRILL

TECHNICAL FIELD

The present invention relates to a drill in which a cut debris discharge groove is formed at an outer periphery of a front end section of a drill body rotated about an axis and a cutting edge is formed at an intersecting ridgeline section between a wall surface of the cut debris discharge groove that faces a rotational direction of the drill and a front end flank face, at a front end of the drill body, and particularly to a drill suitable to be used for high-efficiency working.

BACKGROUND ART

PTLs 1 and 2 disclose drills in which an inner wall surface of the above cut debris discharge groove is formed by two concave circular arcs with different radii in a cross-section perpendicular to an axis. In a drill described in PTL 1 out of these drills, the radius of a circular arc formed by a cross-section of a second concave surface extending from a core diameter circle to a heel side is made greater than the radius of a circular arc formed by a cross-section of the first concave surface extending from a leading edge side to a core diameter circle. Additionally, in the drill described in PTL 2, contrary to the above, the radius of a first circle formed by a cross-section on the leading edge side in the cross-section perpendicular to the axis is made greater than the radius of a second circle on the heel side.

RELATED ART DOCUMENT

Patent Document

[PTL 1]: Japanese Patent No. 4120185
[PTL 2]: Japanese Patent No. 4894054

DISCLOSURE OF THE INVENTION

Problem That the Invention is to Solve

However, in the drills described in these PTLs 1 and 2, the circular arcs formed by the cross-sections of the first and second concave surfaces, or the first and second circles are all in contact with the core diameter circle inscribed on the cut debris discharge groove of the drill body front end section. For this reason, even in any of the drills, the groove width of the cut debris discharge groove easily becomes large, the cross-sectional area of the drill body front end section becomes small, and the rigidity or strength decreases. Therefore, in high-efficiency working in which the drill body is rotated at a high speed and fed at a high feed rate, there is a concern that breakage or the like occurs in the drill body front end section.

Meanwhile, if the radii of the above circular arcs or the above circles are made small in order to make the groove width of the cut debris discharge groove small to ensure the cross-sectional area of the drill body front end section, cut debris passing through the inside of the cut debris discharge groove in great quantities at a high speed at the time of the high-efficiency working strongly rubs the inner wall surface of the groove. Thus, a scratch is formed in the inner wall surface, and a grinding margin at the time of re-grinding should be enlarged, or a fracture is easily caused in the cutting edge or the vicinity thereof. Additionally, if the radii of the above circular arcs or the above circles are made small in this way, particularly in the drill described in PTL 1 in which the radius of the second circle on the heel side becomes smaller than the radius of the first circle on the leading edge side, there is a concern that cut debris pushed into the heel side of the cut debris discharge groove by the rotation of the drill body causes clogging without being sufficiently curled.

The invention has been made under such a background, and an object thereof is to provide a drill suitable to be used for high-efficiency working that can prevent the formation of a scratch by cut debris or the occurrence of a fracture of a cutting edge or the like and cut debris clogging while suppressing the groove width of a cut debris discharge groove from becoming large and ensuring the rigidity or strength of a drill body front end section.

Means for Solving the Problem

In order to solve the above problems and to achieve such an object, the invention provides a drill in which a cut debris discharge groove is formed at an outer periphery of a front end section of a drill body rotated about an axis and a cutting edge is formed at a front end of the drill body. A wall surface of the cut debris discharge groove, which faces a rotational direction of the drill, is formed to have a concave curve line shape extending in a cross-section perpendicular to the axis, the concave curve line shape extending along a first circular arc. A bottom surface of the cut debris discharge groove, which continues to the wall surface and which faces an outer peripheral side of the drill body, is formed to have a concave curve line shape in the cross-section perpendicular to the axis, the concave curve line shape extending along a second circular arc to be tangent with a core diameter circle at the front end section of the drill body. The first circular arc has a greater radius than the second circular arc and is in contact with the second circular arc at a position closer to the leading edge side than the point of contact between the second circular arc and the core diameter circle.

In the drill configured in this way, the first circular arc along which a concave curve line formed by a cross-section of the wall surface of the cut debris discharge groove that faces the rotational direction of the drill extends is in contact with the second circular arc at the position closer to the leading edge side than the point of contact between the second circular arc and the core diameter circle along which a concave curve line formed by a cross-section of the bottom surface of the cut debris discharge groove that faces the outer periphery side of the drill body extends. Thus, for example, with respect to the drill described in PTL 2, if the radii of the first and second circles and the radii of the first and second circular arcs are made equal to each other and the diameter of the core diameter circle and the external diameter of the drill body front end section are also made equal to each other, the first circular arc is located closer to the forward side in the drill rotational direction while remaining in contact with the second circular arc. Thus, the groove width of the cut debris discharge groove can be made small. For this reason, it is possible to enlarge the cross-sectional area of the drill body front end section particularly on the outer peripheral side to increase a cross-section secondary moment to ensure the rigidity or strength.

Additionally, if the groove width of the cut debris discharge groove is made equal, the radius of the first circular arc can be further enlarged. Thus, a formation of a scratch can be prevented by suppressing the friction of cut debris with the wall surface of the cut debris discharge groove that faces the drill rotational direction. Moreover, since the point of contact with the first circular arc is located on the leading edge side, the second circular arc can be lengthened. Thus, cut debris pushed in from the leading edge side to the heel side by the rotation of the drill body can be brought into sliding contact with the bottom surface of the cut debris discharge groove that forms a concave curve line cross-sectional shape extending along the second circular arc and sufficiently curled.

Therefore, according to the drill of the above configuration, even in high-load high-efficiency working in which a large amount of cut debris passes through the inside of the cut debris discharge groove at a high speed, it is possible to prevent the occurrence of a situation in which the front end section of the drill body breaks, a grinding margin at the time of re-grinding is increased, a fracture occurs in the cutting edge or the vicinity thereof, or cutting debris clogging occurs, and it is possible to prolong the lifespan of the drill and perform stable drilling.

Here, it is preferable that the point of contact between the first and second circular arcs in the cross-section perpendicular to the axis is located within a range of 0.1×D to 0.35×D with respect to the external diameter D of the cutting edge from the axis. If the position of this point of contact is a position closer to the axis than the above range and close to the point of contact between the second circular arc and the core diameter circle, there is a concern that the effects as described above cannot be reliably exerted. Meanwhile, if the position is excessively separated from the axis more than the above range, there are concerns that the wall surface that faces the drill rotational direction in the cut debris discharge groove that forms the concave curve line extending along the first circular arc in the above cross-section becomes too small, the cross-sectional area of the cut debris discharge groove becomes insufficient even if the groove width is made small, the volume of the groove becomes insufficient, and cut debris clogging is caused.

Additionally, similarly, with respect to the external diameter D of the cutting edge, the radius of the first circular arc is within a range of 1.0×D to 3.0×D, and the radius of the second circular arc is within a range of 0.2×D to 0.4×D. If the radii of the first and second circular arcs are large to such a degree that the radii exceed the above ranges, respectively, there is a concern that the groove width of the cut debris discharge groove becomes too large. On the contrary, if the radii are small to such a degree that the radii fall below the above ranges, there is a concern that the friction of cut debris with the wall surface that faces the drill rotational direction or the bottom surface that faces the outer peripheral side of the drill body becomes too large.

Advantage of the Invention

As described above, according to the invention, even in high-efficiency working in which the drill body is rotated at a high speed and fed at a high feed rate, it is possible to smoothly discharge cut debris to perform stable drilling while preventing damage to the drill body to prolong the lifespan of the drill.

BRIEF DESCRIPTION OF DRAWINGS

FIG. 1 is a front view illustrating an embodiment of the invention as seen from a front end side in an axis direction.

FIG. 2 is a side view of the embodiment illustrating in FIG. 1.

FIG. 3 is a sectional view perpendicular to the axis of a drill body front end section of the embodiment illustrated in FIG. 1.

BEST MODE FOR CARRYING OUT THE INVENTION

FIGS. 1 to 3 illustrate an embodiment of the invention. In the present embodiment, a drill body 1 is formed in a columnar outer shape centered on an axis O using a hard material, such as cemented carbide, and has a rear end section (not illustrated) formed as a shank section. When this shank section is gripped by a spindle of a machine tool, the drill body is rotated about the axis O in a rotational direction T of the drill, is fed to a front end side (a left side in FIG. 2) in the direction of the axis O, and performs drilling in a workpiece material.

A pair of cut debris discharge grooves 2 are formed to be rotationally symmetrical by 180° with respect to the axis O in the present embodiment at the outer periphery of a front end section of the drill body 1. The cut debris discharge grooves open to a front end surface of the drill body 1 and are twisted about the axis O to a backward side in the rotational direction T of the drill as they go to a rear end side. Cutting edges 4 are respectively formed on intersecting ridgeline sections between wall surfaces 2A of the cut debris discharge grooves 2 that face the rotational direction T of the drill, and front end flank faces 3 extending to a backward side in the rotational direction T of the drill from openings of the cut debris discharge grooves 2 in a front end surface of the drill body 1. That is, the drill of the present embodiment is a two-blade twist drill.

Each front end flank face 3 is inclined so as to face the rear end side of the drill body 1 as it goes to the backward side in the rotational direction T of the drill and gives a flank angle to the cutting edge 4, and is inclined so as to face the rear end side even toward the outer peripheral side of the front end section of the drill body 1 and gives a point angle to the cutting edge 4. In addition, in the present embodiment, the front end flank face 3 is formed with a first flank face 3A that continues to a backward side of the cutting edge 4 in the rotational direction T of the drill, and a second flank face 3B that continues to a further backward side of the first flank face 3A in the rotational direction T of the drill and gives a greater flank angle than the first flank face 3A.

Additionally, a margin section 5A is formed at an intersecting ridgeline section intersecting the wall surface 2A of the cut debris discharge groove 2 that faces the rotational direction T of the drill, an outer peripheral surface of the front end section of the drill body 1, this margin section is located on a cylindrical surface having an external diameter equal to the external diameter D (not illustrated, the diameter of a circle that an outer peripheral end of the cutting edge 4 forms about the axis O) of the cutting edge 4 and having the axis O as a center, and a portion located closer to the backward side in the rotational direction T of the drill than the margin section 5A is formed as a relieving surface 5B having a slightly smaller diameter than the above external diameter D. An intersection ridgeline between the margin section 5A and the wall surface 2A is formed as a leading edge 1A of the front end section of the drill body 1, and an intersection ridgeline between the relieving surface 5B and the wall surface 2B of the cut debris discharge groove 2 that faces the backward side in the rotational direction T of the drill is formed as a heel 1B. In addition, a back taper may be given to the margin section 5A.

Moreover, a thinning section 6 is formed on the inner peripheral side, that is, the axis O side of the opening in the front end surface of the drill body 1 of the cut debris discharge groove 2 so as to cut out an inner peripheral section of the wall surface of the cut debris discharge groove 2, which faces the rotational direction T of the drill, to the axis O side. The thinning section 6 is formed with a thinning surface 6A that faces the rotational direction T of the drill, and a thinning wall surface 6B that intersects the second flank face 3B of the front end flank face 3 that faces the backward side in the rotational direction T of the drill and is adjacent to a forward side in the rotational direction T of the drill. In the present embodiment, the thinning wall surface 6B extends so as to reach the heel 1B of the outer periphery of the front end section of the drill body 1.

The cutting edge 4 is formed with a main cutting edge 4A extending from the outer peripheral end of the cutting edge 4 to the inner peripheral side thereof, and a thinning edge 4B that continues to the inner periphery of the main cutting edge 4A and is formed at an intersecting ridgeline section between the thinning surface 6A of the thinning section 6 and the front end flank face 3 (first flank face 3A). The wall surface 2A of the cut debris discharge groove 2 that faces the rotational direction T of the drill is formed as a rake face of the main cutting edge 4A, and when the cut debris discharge groove 2 is twisted as described above, a positive rake angle is given to the main cutting edge 4A, and the thinning surface 6A is formed as a rake face of the thinning edge 4B.

Moreover, coolant holes 7 twisted with the same lead as that of the cut debris discharge grooves 2 are respectively formed in the portions between the pair of cut debris discharge grooves 2 in the circumferential direction, within the front end section of the drill body 1. In the present embodiment, each of the coolant holes 7 includes a forward hole wall surface that is located on the forward side in the rotational direction T of the drill and is convexly curved with a substantially constant spacing from the wall surface 2A of the cut debris discharge groove 2, a backward hole wall surface that is located on the backward side in the rotational direction T of the drill and is convexly curved with a substantially constant spacing from the wall surface 2B, and an outer peripheral hole wall surface that is located on the outer peripheral side of the drill body 1 and is concavely curved with a substantially constant spacing from the relieving surface 5B, in the cross-section perpendicular to the axis O as illustrated in FIG. 3, and is formed in a substantially triangular shape.

Therefore, the forward hole wall surface and the backward hole wall surface of the coolant hole 7 are formed such that their mutual circumferential gap increases gradually as they go to the outer peripheral side and the increasing rate of this gap also becomes gradually larger toward the outer peripheral side. However, in the cross-section perpendicular to the axis O, a corner of the triangular shape where the forward and backward hole wall surfaces intersect each other and corners where the forward and backward hole wall surfaces and the outer peripheral hole wall surface intersect each other smoothly continue to the wall surfaces by concave circular arcs with a small radius. Such a coolant hole 7, as illustrated in FIG. 1, is made to open to open to the second flank face 3B in the front end flank face 3 of the drill body 1.

An inner surface of the cut debris discharge groove 2 includes the wall surface 2A that faces the rotational direction T of the drill, the wall surface 2B that faces the backward side in the rotational direction T of the drill, and a bottom surface 2C that is located between the wall surfaces 2A and 2B and faces the outer peripheral side of the drill body 1. As illustrated in FIG. 3, in the cross-section perpendicular to the axis O, the wall surface 2A that faces the rotational direction T of the drill is formed to have a concave curve line shape extending along a first circular arc C1, the bottom surface 2C that faces the outer peripheral side of the drill body 1 is formed to have a concave curve line shape extending along a second circular arc C2 to be tangent with a core diameter circle E of the front end section of the drill body 1, the radius R1 of the first circular arc C1 is made greater than the radius R2 of the second circular arc C2, and the first circular arc C1 is in contact with the second circular arc C2 at a point Q of contact located closer to the leading edge 1A side than a point P of contact of the second circular arc C2 and the core diameter circle E.

In other words, in the cross-section orthogonal to the axis O, a portion from the leading edge 1A to the point Q of contact between the first and second circular arcs C1 and C2 is formed as the wall surface 2A of the cut debris discharge groove 2 that faces the rotational direction T of the drill, and a portion extending from the point Q of contact via the point P of contact between the second circular arc C2 and the core diameter circle E to the heel 1B side is formed as the bottom surface 2C of the cut debris discharge groove 2 that faces the outer peripheral side of the drill body 1. In addition, in the cross-section perpendicular to the axis O, the wall surface 2B of the cut debris discharge groove 2 that faces the backward side in the rotational direction T of the drill is bent after extending from the bottom surface 2C toward the heel 1B side substantially along the second circular arc C2, and is formed so as to reach the heel 1B while drawing a convex curve line that is slightly convexly curved to the backward side in the rotational direction T of the drill.

Here, in the present embodiment, the point Q of contact between the first and second circular arcs C1 and C2 in the cross-section perpendicular to the axis O is located within a range of 0.1×D to 0.35×D with respect the external diameter D of the cutting edge 4 from the axis O in this cross-section, that is, the spacing L between the point Q of contact and the axis O is within a range of 0.1×D to 0.35×D. Additionally, in the present embodiment, the diameter (core diameter) d of the core diameter circle E is within a range of 0.15×D to 0.4×D, but is made smaller than 2×L that is two times greater than the spacing L.

Moreover, the radius R1 of the first circular arc C1 is within a range of 1.0×D to 3.0×D with respect to the external diameter D of the cutting edge 4, and the radius R2 of the second circular arc C2 is within a range of 0.2×D to 0.4×D. In addition, since the wall surface 2A of the cut debris discharge groove 2 that faces the rotational direction T of the drill is formed as a concave curve line extending along the first circular arc C1 with the greater radius R1 in the cross-section perpendicular to the axis O in this way, the main cutting edge 4A of the cutting edge 4 having a rake face as the wall surface 2A as described above is similarly formed to have a concave curve line shape with a greater radius as seen from the front end side in the direction of the axis O, or a substantially linear shape as illustrated in FIG. 1.

Additionally, in the present embodiment, in the above cross-section, a groove angle formed between the first radius line that passes through the axis O and is in contact with the first circular arc C1 and a second radius line that is in contact with the second circular arc C2 is within a range of 60° to 90°. Moreover, the center of the first circular arc C1 is located closer to the outer peripheral side of the drill body 1 in a direction in which the first radius line extends, than an intersection point between a radius line that bisects the groove angle through the axis O and a circle having the axis O as a center and having the external diameter D as its diameter, and the center of the second circular arc C2 is located closer to the axis O side than the intersection point.

In the drill configured in this way, the radius R1 of the first circular arc C1 along which a concave curve line formed by the wall surface 2A of the cut debris discharge groove 2 that faces the rotational direction T of the drill in the cross-section perpendicular to the axis extends is greater than the radius R2 of the second circular arc C2 to be tangent with the core diameter circle E along which the concave curve line formed by the bottom surface 2C that faces the outer peripheral side of the drill body 1 extends, and the point Q of contact between the first and second circular arcs C1 and C2 is located closer to the leading edge 1A side than the point P of contact between the second circular arc C2 and the core diameter circle E. Thus, the leading edge 1A is located closer to the forward side in the rotational direction T of the drill, compared to a case where the point Q of contact coincides with the point P of contact between the second circular arc C2 and the core diameter circle E.

For this reason, since the groove width of the cut debris discharge groove 2 can be made smaller and the land width can be increased, it is possible to ensure a large cross-sectional area in the front end section of the drill body 1. Moreover, since the cross-sectional area becomes larger particularly on the outer peripheral side of the front end section of the drill body 1, a cross-section secondary moment can be effectively increased, the rigidity or strength of the front end section of the drill body 1 can be reliably ensured, and it is possible to prevent breakage from occurring in the front end section of the drill body 1 in high-efficiency working exerting a high load.

Additionally, compared to a case where the point Q of contact coincides with the point P of contact between the second circular arc C2 and the core diameter circle E, the radius R1 of the first circular arc C1 can be enlarged as described above if the groove width of the cut debris discharge groove 2 is the same. Thus, even if a large amount of cut debris passes through the inside of the cut debris discharge groove 2 in the high-efficiency working, the friction of the cut debris with the wall surface 2A of the cut debris discharge groove 2 that faces the rotational direction T of the drill can be reduced, and a scratch can be prevented from being formed on the wall surface 2A. Therefore, it is possible to prevent the occurrence of a situation in which a grinding margin is increased in order to grind the front end flank face 3 up to a position where there is no such scratch at the time of re-grinding and the lifespan of the drill becomes short or that a scratch is left in the cutting edge or the vicinity thereof and a fracture is apt to occur.

Moreover, as the radius R1 of the first circular arc C1 along which the concave curve line formed by the cross-section of the wall surface 2A of the cut debris discharge groove 2 that faces the rotational direction T of the drill in this way extends can be enlarged, the main cutting edge 4A formed at the intersecting ridgeline section between the wall surface 2A and the front end flank face 3 can also be formed to have the concave curve line shape with a greater radius or the substantially linear shape as described above. For this reason, the strength of the cutting edge 4 can be ensured not only after re-grinding but also when the drill is used, and the occurrence of a fracture or the like can also be prevented in the high-load high-efficiency working.

Moreover, when the point Q of contact between the first and second circular arcs C1 and C2 is located closer to the leading edge 1A side than the point P of contact between the second circular arc C2 and the core diameter circle E, the length of the concave curve line formed by the cross-section of the bottom surface 2C of the cut debris discharge groove 2 extending along the second circular arc C2 can be lengthened. Therefore, cut debris pushed into the bottom surface 2C extending along the second circular arc C2 with the smaller radius R2 from the leading edge 1A side with the rotation of the drill body 1 can be sufficiently brought into sliding contact with the bottom surface 2C and curled, and smooth cut debris discharge can be encouraged by preventing the occurrence of cut debris clogging.

Additionally, in the present embodiment, the position of the point Q of contact between the first and second circular arcs C1 and C2 is within a range of $0.1 \times D$ to $0.35 \times D$ with respect to the external diameter D of the cutting edge 4 from the axis O, and it is thereby possible to more reliably exert the above-described effects. That is, if the position of the point Q of contact is located closer to the axis O side than the above range, and is too close to the point P of contact between the second circular arc C2 and the core diameter circle E, there are concerns that the cross-sectional area of the front end section of the drill body 1 cannot be enlarged, and rigidity or strength cannot be ensured. On the contrary, if the point Q of contact is located closer to the outer peripheral side than the above range, there are concerns that the portion extending along the second circular arc C2 with the smaller radius R2 in the cross-section of the cut debris discharge groove 2 becomes too large, and the volume of the cut debris discharge groove 2 becomes insufficient and cut debris clogging is caused.

Moreover, in the present embodiment, as described above, the radius R1 of the first circular arc C1 is sufficiently enlarged to be within a range of $1.0 \times D$ to $3.0 \times D$ with respect to the external diameter D of the cutting edge 4, and the radius R2 of the second circular arc C2 is within a range of $0.2 \times D$ to $0.4 \times D$ with respect to the external diameter D of the cutting edge 4. This also enables stable drilling while reliably maintaining the rigidity or strength of the front end section of the drill body 1. That is, if the radii R1 and R2 of the first and second circular arcs C1 and C2 are greater than the above ranges, respectively, there are concerns that the groove width of the cut debris discharge groove 2 becomes too large, and the front end section of the drill body 1 breaks easily in the high-efficiency working. On the contrary, if the radii are smaller than the above ranges, there are concerns that the friction of cut debris with the wall surface 2A or the bottom surface 2C of the cut debris discharge groove 2 become larges, and formation of a scratch cannot be reliably prevented or cut debris clogging is caused.

EXAMPLES

Next, the effects of the invention will be described taking an example of the invention. In the present example, a drill made of cemented carbide in which the external diameter D of the cutting edge 4 is 8 mm, the radius R1 of the first circular arc C1 is 12.8 mm ($1.6 \times D$), the radius R2 of the second circular arc C2 is 1.76 mm ($0.22 \times D$), and the spacing L from the axis O to the point Q of contact is 1.92 mm ($0.24 \times D$) was manufactured on the basis of the above-described embodiment. In addition, the diameter (core diameter) d of the core diameter circle E is 2.00 mm ($0.25 \times D$) in both the present example and Comparative Examples 1 and 2 to be described below.

Additionally, a drill made of cemented carbide based on PTL 1 in which the external diameter D of the cutting edge 4 is 8 mm similar to the present example, and the radius R2 of the second circular arc C2 is made greater than the radius R1 of the first circular arc C1 contrary to the present example, and a drill made of cemented carbide based on PTL 2 in which the radius R1 of the first circular arc C1 is greater than the radius R2 of the second circular arc C2, but the point Q of contact between the first and second circular arcs C1 and C2 coincides with the point P of contact between the core diameter circle E and the second circular arc C2 were also manufactured as the comparative examples with respect to the present example. These are referred to as Comparative Examples 1 and 2 in order.

In addition, the radius R1 of the first circular arc C1 of Comparative Example 1 is 2.4 mm (0.3×D), the radius R2 of the second circular arc C2 is 2.64 mm (0.33×D), the spacing L from the axis O to the point Q of contact is 1.0 mm (0.125×D) equal to the radius d/2 of the core diameter circle E, and the radius R1 of the first circular arc C1 of Comparative Example 2 is 3.2 mm (0.4×D), the radius R2 of the second circular arc C2 is 0.24 mm (0.3×D), and the spacing L from the axis O to the point Q of contact is also 1.0 mm (0.125×D) equal to the radius d/2 of the core diameter circle E.

Then, high-efficiency drilling tests in which through-holes were formed in a plate material with a thickness of 40 mm made of S50C using the drills of the present example and Comparative Examples 1 and 2 under the cutting conditions in which the cutting speed is 200 m/min and the feed rate is 0.35 mm/rev were performed, and the lengths of cut capable of being worked and the states of the drills after the tests were investigated. In addition, wet cutting in which a vertical machining center was used and a coolant was supplied with a pressure of 1 MPa from the coolant holes 7 was adopted in the tests.

As a result, in Comparative Example 1, a crack occurred in the main cutting edge in a place where the length of cut reached 25 m (625 holes), and drilling became impossible. Additionally, in Comparative Example 2, a fracture occurred at the outer periphery of a front end section of a drill body in a length of cut of 20 m (500 holes), and drilling became impossible. In contrast, in the present example, even in places where the length of cut reached 40 m (1000 holes), drilling was possible, and the tests were ended at that time. In the drill of the present example after the tests, although some wear was confirmed in the cut debris discharge groove 2, neither a fracture nor chipping was confirmed.

DESCRIPTION OF REFERENCE NUMERALS AND SIGNS

1: Drill Body
1A: Leading Edge
1B: Heel
2: Cut Debris Discharge Groove
2A: Wall Surface of Cut Debris Discharge Groove 2 That Faces Rotational Direction T of Drill
2B: Wall Surface of Cut Debris Discharge Groove 2 That Faces Backward Side in Rotational Direction T of Drill
2C: Bottom Surface of Cut Debris Discharge Groove 2 That Faces Outer Peripheral Side of Drill Body 1
3: Front End Flank Face
4: Cutting Edge
O: Axis of Drill Body 1
T: Rotational Direction of Drill
C1: First Circular Arc
C2: Second Circular Arc
E: Core Diameter Circle
P: Point of contact Between Second Circular Arc C2 and Core Diameter Circle E
Q: Point of Contact of First, Second Circular Arc C1, C2
R1: Radius of First Circular Arc C1
R2: Radius of Second Circular Arc C2
L: Spacing Between Axis O and Point Q of Contact

The invention claimed is:

1. A drill in which a cut debris discharge groove is formed at an outer periphery of a front end section of a drill body rotated about an axis and a cutting edge is formed at a front end of the drill body,
wherein a wall surface of the cut debris discharge groove, which faces a rotational direction of the drill, is formed to have a concave curve line shape extending in a cross-section perpendicular to the axis, the concave curve line shape extending along a first circular arc,
wherein a leading edge is formed at the outer periphery of the wall surface,
wherein a bottom surface of the cut debris discharge groove, which continues to the wall surface and which faces an outer peripheral side of the drill body, is formed to have a concave curve line shape in the cross-section perpendicular to the axis, the concave curve line shape extending along a second circular arc to be tangent with a core diameter circle at the front end section of the drill body,
wherein the first circular arc has a greater radius than the second circular arc and is in contact with the second circular arc at a position closer to the leading edge than the point of contact between the second circular arc and the core diameter circle,
wherein in the cross-section perpendicular to the axis, the position, at which the first circular arc is in contact with the second circular arc, is located in front of a line segment joining the leading edge and the axis in the rotational direction, and
wherein the cutting edge is formed with
a main cutting edge extending from the outer peripheral end of the cutting edge to the inner peripheral side thereof and having a substantially linear shape as seen from the front end side in the direction of the axis and a thinning edge that continues to the inner periphery of the main cutting edge.

2. The drill according to claim 1,
wherein in the cross-section perpendicular to the axis, the point of contact between the first and second circular arcs is within a range of 0.1×D to 0.35×D with respect to the external diameter D of the cutting edge from the axis,
wherein with respect to the external diameter D of the cutting edge, the radius of the first circular arc is within a range of 1.0×D to 3.0×D, and the radius of the second circular arc is within a range of 0.2×D to 0.4×D, and
wherein in the cross-section perpendicular to the axis, a groove angle between the first radius line that passes through the axis and is in contact with the first circular arc and the second radius line that passes through the axis and is in contact with the second circular arc, is within a range of 60° to 90°.

* * * * *